Dec. 30, 1969 E. J. HAYES Re. 26,746

SUPPORT MEANS FOR A SLIDING CALIPER TYPE DISK BRAKE

Original Filed Dec. 28, 1966 4 Sheets-Sheet 1

INVENTOR.
Edward J. Hayes
BY
Harness, Dickey & Pierce.
ATTORNEYS.

SUPPORT MEANS FOR A SLIDING CALIPER TYPE DISK BRAKE

Original Filed Dec. 28, 1966 4 Sheets-Sheet 3

INVENTOR.
Edward J. Hayes
BY
Harness Dickey & Pierce
ATTORNEYS.

SUPPORT MEANS FOR A SLIDING CALIPER TYPE DISK BRAKE

Original Filed Dec. 28, 1966 4 Sheets-Sheet 3

INVENTOR.
Edward J. Hayes
BY
Harness, Dickey & Pierce
ATTORNEYS.

SUPPORT MEANS FOR A SLIDING CALIPER TYPE DISK BRAKE
Original Filed Dec. 28, 1966 4 Sheets-Sheet 4
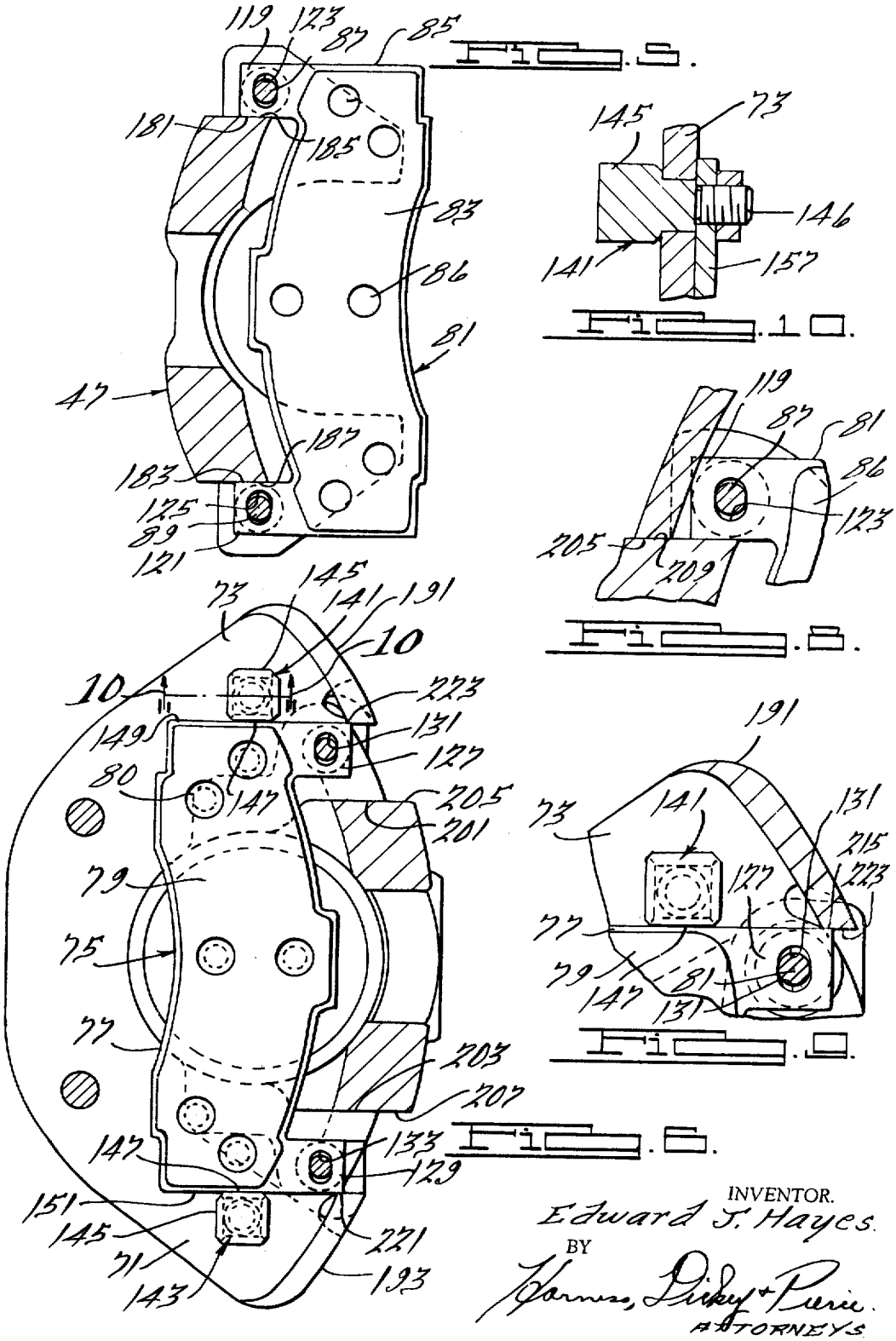

United States Patent Office

Re. 26,746
Reissued Dec. 30, 1969

26,746

SUPPORT MEANS FOR A SLIDING CALIPER TYPE DISK BRAKE

Edward J. Hayes, Ann Arbor, Mich., assignor to Kelsey-Hayes Company, Romulus, Mich., a corporation of Delaware Original No. 3,375,906, dated Apr. 2, 1968, Ser. No. 605,389, Dec. 28, 1966. Application for reissue Sept. 20, 1968, Ser. No. 763,430
Int. Cl. F16d *55/224*
U.S. Cl. 188—73 17 Claims

Matter enclosed in heavy brackets [ ] appears in the original patent but forms no part of this reissue specification; matter printed in italics indicates the additions made by reissue.

ABSTRACT OF THE DISCLOSURE

This invention relates to brakes for automotive vehicles, and more particularly to disk brakes in which an uncomplicated, compact and effective means is provided for permitting movement of a caliper and brake shoes relative to the disk to be braked in a direction to achieve proper braking action while restraining other unwanted movement of the caliper and brake shoes relative to the disk, said means including a fixed torque plate engaged by said caliper. Flexible strap means are also secured to the torque plate and caliper for adjusting the position of the caliper upon brake shoe wear and to aid in preventing said unwanted movement of the caliper.

In the disk brake of this invention, a stationary torque plate is disposed generally parallel to a rotary disk that may be attached to a wheel of an automotive vehicle. A caliper having a fluid motor portion positioned on one side of the disk and a reaction portion on the other is held against rotation by the torque plate. A first brake shoe is disposed between the torque plate and the disk and a second brake shoe is disposed between the disk and the reaction portion of the caliper and is motivated by this reaction portion.

In disk brakes of the type described above, there is a twisting couple produced by the braking action about the fixed torque plate, when the two brake shoes engage the opposed faces of the rotary disk to be braked. It can be readily appreciated that if this twisting couple is permitted to twist the caliper in a plane generally perpendicular to the plane of the disk that uneven wear of the brake shoes would result, with one of the edges of each of the shoes wearing at a rate greater than the other edge of the shoe.

The present invention provides a means for resisting this twisting couple and for restraining the caliper for movement in a direction perpendicular to the disk to be braked so that even wear of both of the brake shoes occurs. This means is formed integrally with the fixed torque plate and it comprises a pair of integrally formed circumferentially spaced arms, with each arm having an axially extending abutment surface positioned radially outwardly of the outer periphery of the disk. Each of these abutment surfaces slidably engages one of a pair of circumferentially spaced axially extending shoulders intermediate the fluid motor portion and the reaction portion of the caliper.

A flexible strap is preferably affixed to the torque plate and to the caliper, preferably the fluid motor portion thereof, for permitting movement of the caliper in a direction generally perpendicular to the disk and the means on the torque plate engaging the caliper prevent any twisting of the caliper due to the twisting couple produced when the two brake shoes engage the rotor during braking action.

The caliper has a pair of flanges extending outwardly therefrom positioned on the fluid motor portion and a second pair of flanges extending outwardly therefrom positioned on the reaction portion of the caliper. One of the flanges on the reaction portion of the caliper is axially aligned with one of the flanges on the fluid motor portion of the caliper, while the other of the flanges on the fluid motor portion of the caliper is aligned with the other flange on the reaction portion of the caliper. A pair of spaced pins is rigidly affixed to the fixed torque plate and is resiliently positioned in aligned bores in the flanges on the fluid motor portion of the caliper and the flanges on the reaction portion of the caliper. The first and second brake shoes are carried by these spaced pins preferably by means of elongated apertures positioned in upwardly extending flanges in the backing plate of the brake shoes.

An object of the invention is the provision of an uncomplicated, compact and efficient disk brake that is especially suited for use in braking a wheel of an automotive vehicle.

Another object of the invention is the provision of an uncomplicated, compact and efficient disk brake in which an efficient and compact means is provided to permit the caliper of the disk brake to move in a direction generally perpendicular to the plane of rotation of the disk to be braked while simultaneously preventing other unwanted movement of the caliper with respect to the disk.

A further object of the invention is the provision of an uncomplicated, compact and efficient disk brake in which a caliper is supported on a fixed reaction member or torque plate by a yieldable strap means which will permit movement in a direction generally perpendicular to the disk to be braked and including means on the fixed torque plate engaging the caliper at positions adjacent both of the brake shoes to resist and prevent twisting of the caliper due to the twisting couple produced during braking action.

Other objects and attendant advantages of the present invention may be more readily realized as the specification is considered in connection with the attached drawings in which:

FIG. 5 is a sectional view taken along the lines 5—5 of FIG. 1;

FIG. 6 is a sectional view taken along the lines 6—6 of FIG. 1;

FIG. 7 is a sectional view taken along the lines 7—7 of FIG. 1;

FIG. 8 is a sectional view taken along the lines 8—8 of FIG. 1;

FIG. 9 is a sectional view taken along the lines 9—9 of FIG. 1; and

FIG. 10 is a sectional view taken along the lines 10—10 of FIG. 6.

Figure 1:
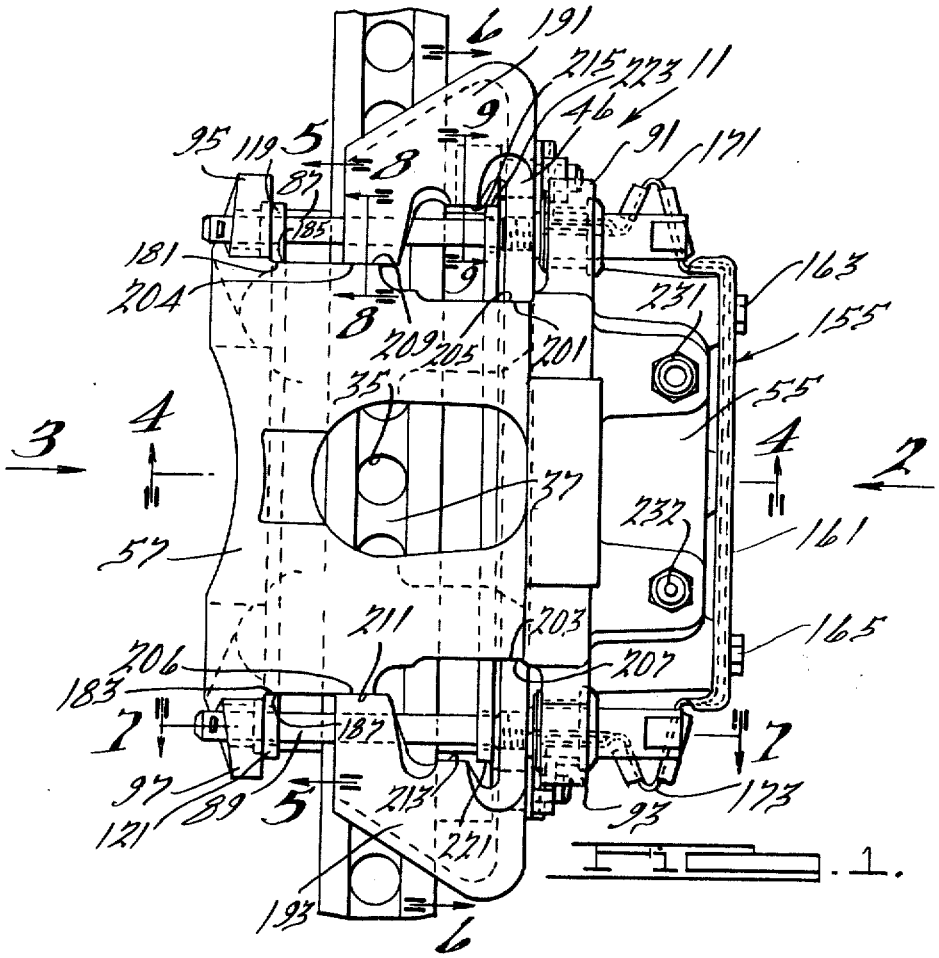
FIGURE 1 is a top plan view of a disk brake of the present invention.

Referring now to the drawings in which like reference numerals designate like parts throughout the several views thereof, a disk brake of the present invention is illustrated generally at 11 in FIGS. 1 through 4, and is shown associated with a vehicle wheel assembly having a hub 13 rotatably mounted on a stationary wheel spindle 15 by bearings 17 and 19. A brake disk or rotor 21 is provided with an attaching flange 23 secured to a flange 25 on the hub 13 by a suitable fastening means, for example, bolt and nut assemblies, one of which is shown at 27. A vehicle wheel 29 is also attached to the flange 25 on the hub by the fastening means 27 through the medium of attaching flange 30.

The brake disk or rotor 21 has a pair of oppositely disposed brake shoe engaging faces 31 and 33 and also has a plurality of radially extending openings 35 that are spaced between webs 37 which serve to move cooling air outwardly through the openings 35 during turning movement of the rotor 21.

A torque plate or fixed reaction member 41 is secured to a support member 42 formed integrally with the spindle 15 by suitable fastening means, for example, a pair of spaced bolts 43 and 45. The torque plate or fixed reaction member 41 has a main body portion 46 that extends in a plane generally parallel to the plane of rotation of the rotary disk 21 and generally parallel to each of the brake shoe engaging faces 31 and 33.

A generally C-shaped housing or caliper 47 is provided with generally opposed legs 55 and 57 disposed on opposite sides of the rotor 21 with the leg 57 disposed in spaced confronting relationship to the rotor face 31 and with the leg 55 disposed in spaced confronting relationship to the rotor face 33. A fluid motor 61 is carried by the caliper leg 55 which forms a fluid motor portion of the caliper and it includes a piston 63 slidably disposed in a cylinder bore 67 formed in the leg 55. A flexible boot 69 is fixed at its end to the caliper leg 55 and to the piston 63 to prevent contamination of the sliding piston and cylinder bore surfaces.

The piston 63 extends between two radially extending legs 71 and 73 and of the torque plate or fixed reaction member 41. The outer end of the piston 63 is positioned to engage a brake shoe 75 that includes a backing plate 77 and a brake lining 79 that may be suitably secured thereto, for example, by bonding or by rivets 80 as shown in FIG. 6. Another brake shoe 81, comprised of brake lining 83 and a backing plate 85 suitably bonded to the brake lining 83 or attached thereto by rivets 86, is positioned so that the brake lining 83 is in opposed relationship to the radial face 31 of the rotor 21.

The brake shoes 75 and 81 are slidably supported by the caliper 47 for movement in a direction generally perpendicular to the plane of rotation of the disk 21 and to the rotor faces 31 and 33 through the medium of a pair of pins 87 and 89. For this purpose, the fluid motor portion 55 of the caliper has a pair of outwardly extending flanges 91 and 93 that extend radially outwardly from the fluid motor portion 55. The reaction portion 57 of the caliper also has a pair of radially outwardly extending flanges 95 and 97, with the flange 95 generally aligned axially with the flange 91 on the fluid motor portion 55 and with the flange 97 generally aligned axially with the flange 93 on the fluid motor portion 55.

Referring now to FIG. 7, the mounting of the pin 89 is shown in detail. It should be understood that the mounting for the pin 87 is identical and hence the structure for mounting the pin 87 will not be described. As shown, leg 71 of the stationary torque plate 41 has a threaded bore 99 positioned therein that receives a threaded portion 101 of the pin 89. This threaded bore 99 is axially aligned with a bore 103 in the flange 93 of the fluid motor portion 55 of the caliper and with a bore 105 positioned in the flange 97 of the reaction portion 57 of the caliper 47. Resilient grommets preferably composed of an elastomeric material and designated by the numerals 107 and 109, respectively, are positioned in the bores 103 and 105, respectively. The grommet 107 receives an enlarged portion 111 of the pin 89, while the grommet 109 receives the other end of the pin 89. A shoulder 113 is formed between the threaded portion 101 and the enlarged portion 111 of the pin 89 so that the shoulder 113 comes into engagement with the leg 71 of the fixed reaction member or stationary torque plate 41 when the threaded portion 101 of the pin 89 is threaded into the threaded bore 99 in the leg 71.

The backing plate 85 of the brake shoe 81 has a pair of oppositely disposed upstanding ears 119 and 121, with the upstanding ear 119 having an elongated slot 123 positioned therein and with the ear 121 having an elongated slot 125 positioned therein. Similarly, the backing plate 77 of the brake shoe 75 has a pair of oppositely disposed upstanding ears 127 and 129 that have elongated slots 131 and 133 positioned therein. The elongated slot 123 in the ear 119 of backing plate 85 receives the pin 87 and the pin 87 is similarly received in the elongated slot 131 positioned in the ear 127 of the backing plate 75. On the other hand, the pin 89 is receiver in the elongated slot 125 in the ear 121 of backing plate 85 and in the elongated slot 133 in the ear 129 in the backing plate 77 of the brake shoe 75.

The pins 87 and 89, therefore, support the backing plate 77 and 85 of the brake shoes 75 and 81 to prevent movement of the brake shoes in a generally vertical radial direction toward the axis of the hub 13 and the spindle 15, while permitting a limited amount of movement in a direction perpendicularly thereto. This may permit a small amount of movement of the brake shoes as the brake linings 83 and 79 are engaged with the rotor faces 31 and 33, respectively, during braking operations.

The fixed torque plate 41 carries a pair of spaced studs 141 and 143 in the spaced arms 73 and 71, respectively. Each of these studs is positioned in an aperture in one of the arms 71 or 73 and is affixed thereto by any suitable means, for example, welding. Each stud has an inwardly extending rectangular portion 145 and an oppositely extending threaded portion 146. The rectangular portion 145 of each of the studs has a face 147 that extends in a plane generally parallel to the edges 149 and 151 of the backing plate 77 to thereby form inwardly extending spaced shoulders arranged generally perpendicular to the disk 21 to absorb the braking torque from the braking lining 79 as it engages the rotor face 33 during braking operations.

Figure 2:
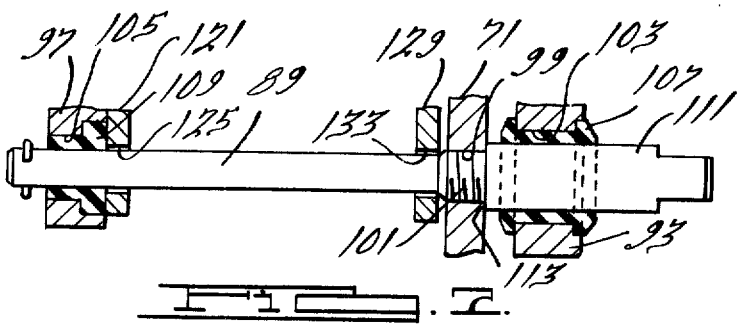
FIG. 2 is a back elevational view of the disk brake of the present invention.
Figure 3:
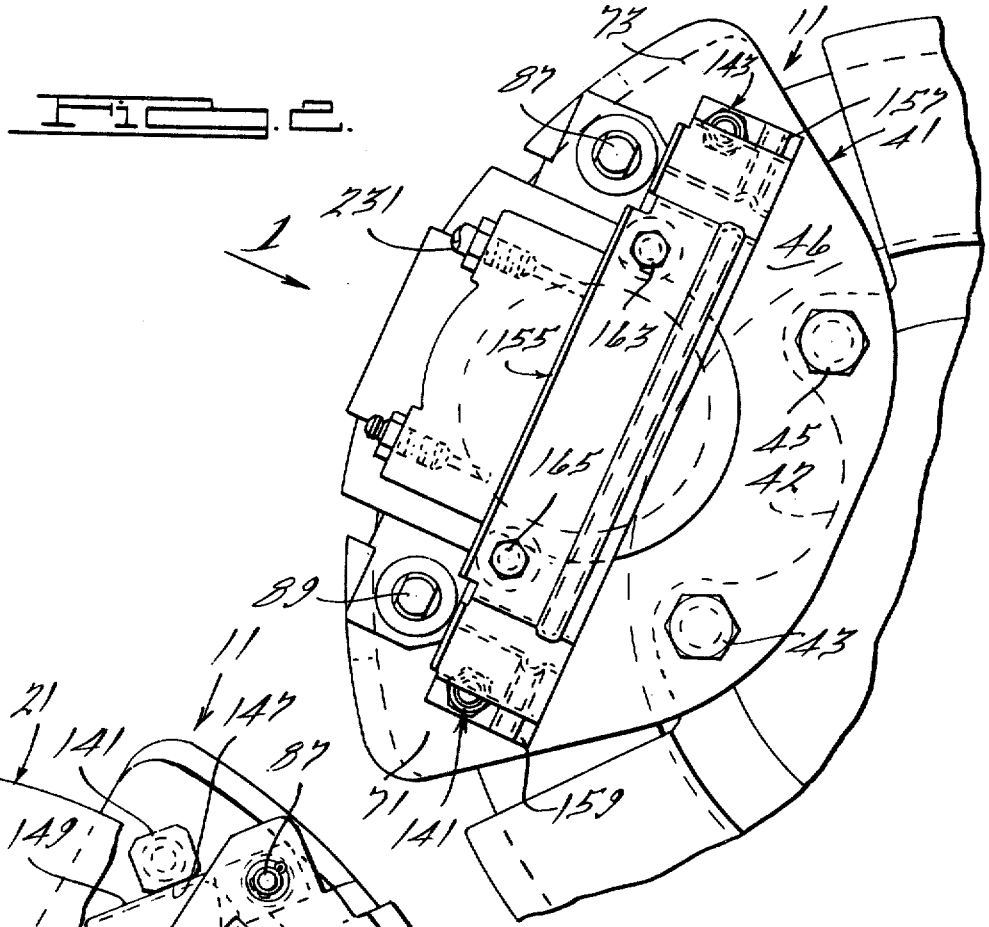
FIG. 3 is a front elevational view of the disk brake of the present invention.
Figure 3:
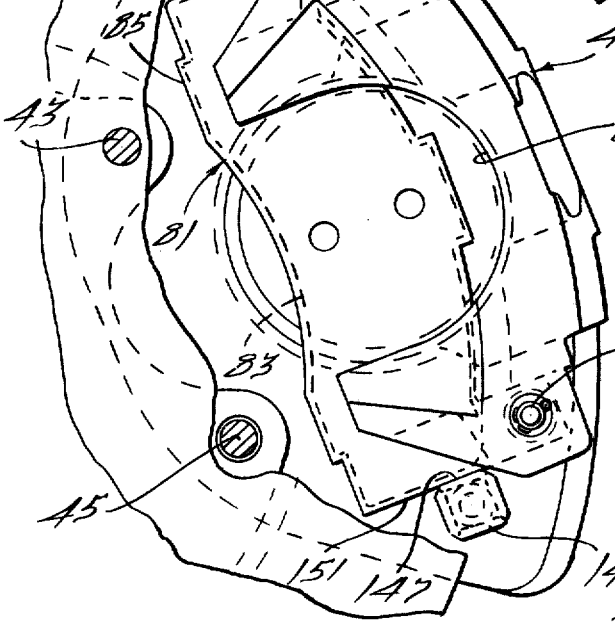

The threaded portions 146 of the studs 141 and 143, respectively, are employed to secure a flexible strap 155 to the arms 71 and 73 of the fixed torque plate 41, as can best be seen by reference to FIGS. 1, 2 and 10. The flexible strap 155 has planar end portions 157 and 159 that have surface apertures positioned therein that may receive threaded portions 146 of the studs 141 and 143, respectively. A pair of nuts may be threaded over these reduced threaded portions 147 of the studs 141 and 143 to secure these end portions 157 and 159 in engagement directly with the arms 73 and 71 of the stationary torque plate 41.

The flexible strap 155 also has a flat planar central portion 161 that is secured to the fluid motor portion 55 of the caliper 47 by a pair of spaced machine screws 163 and 165. The end portion 157 of the flexible strap 155 is connnected to the central portion by a generally U-shaped integrally formed intermediate portion 171, while the end 159 of the flexible strap 155 is joined to the central portion by a generally U-shaped intermediate portion 173. The U-shaped intermediate portions 171 and 173 of the flexible strap are capable of movement so that the U-shaped structure is either narrowed or widened to permit the caliper 47 to move relative to the torque plate 41 during braking operations in a direction generally perpendicular to the disk 21 and to the brake shoe engaging faces 31 and 33, respectively, of this rotor. It can be appreciated that the structure of the flexible strap 155 is such that the generally planar end sections 157 and 159 and the central portion 161 lie in planes generally parallel to the plane of the disk 21 and thereby provide column support in a radial direction with respect to the axis or the hub 13 and axle 15 to resist movement of the caliper relative to the disk in any direction except in a direction that is generally perpendicular to the disk.

The ears 119 and 21 of the backing plate 85 of the brake shoe 8 have opposed inwardly extending surfaces 181 and 183 that extend in a direction generally perpendicular to the disk 121 and that are engageable with complementary edges or shoulders 185 and 187 on the reaction portion 57 of the caliper 47, during braking operations. This serves to transfer the braking torque absorbed by the lining 83 from the braking surface 31 to the reaction portion 57 of the caliper 47.

The fixed torque plate 41 has means thereon that are engageable with the caliper 47 intermediate the fluid motor portion 55 and the reaction portion 57 to prevent rotation of the caliper 47 with respect to the torque plate 41 and to prevent and resist the twisting couple exerted on the caliper 47 during braking operations. This twisting couple occurs when the braking torque from the brake shoes 75 and 81 is transferred by the means described above to the fixed torque plate 41 and to the reaction portion 57 of the caliper 47, respectively. This means preferably comprises a pair of axially extending flanges 191 and 193 that extend in an axial direction from and are integrally formed with the spaced arms 71 and 73, respectively, of the torque plate 41. These axially extending flanges 191 and 193 have means positioned thereon for engaging the caliper 47 adjacent the brake shoe 75 and intermediate the reaction portion 57 and the fluid motor portion 55. As can best be seen by reference to FIGS. 1 and 6, this means includes spaced shoulders 201 and 203 on the main body portion 46 of the torque plate 41 that are positioned in sliding engagement with complementary outwardly positioned surfaces 205 and 207 positioned on the fluid motor portion 55 of the caliper 47 adjacent the brake shoe 75.

The axially extending flanges 191 and 193 also have inwardly extending abutment surfaces that form inwardly spaced shoulders 204 and 206 arranged generally perpendicular to the disk 21. These spaced shoulders 204 and 206 are positioned in engagement with complementary circumferentially spaced, axially extending shoulders 209 and 211 positioned on the caliper 47, and more particularly, positioned intermediate the reaction portion 57 and the fluid motor portion 55 of the caliper 47.

The axially extending flanges 191 and 193 also have intermediate inwardly spaced shoulders or surfaces 213 and 215 that are positioned between the shoulders 204 and 201, respectively, and 206 and 203, respectively. The shoulders or surfaces 213 and 215 engage complementary outwardly facing surfaces 221 and 223 on the ears 129 and 127, respectively, of the backing plate 77 of the first brake shoe 75 when the lining 79 becomes worn and the brake shoe 75 moves inwardly toward the rotor face 33. This feature prevents the cocking or binding of the brake shoe 75 as the lining 79 becomes worn. This cocking of the brake shoe may occur after the lining 79 wears and the brake shoe must travel a considerable degree on the pins 87 and 89 during braking operations, since the elongated slots 131 and 133 positioned in the ears 127 and 129 may permit some sideways movement of the brake shoe when it travels a considerable distance. These spaced shoulders 213 and 215 then provide an additional means for transferring the braking torque from the brake shoe 75 to the fixed torque plate 41, that is, in addition to the surfaces 147 positioned on the rectangular portions 145 of the studs 141 and 143.

The fluid motor 61 is provided with a suitable source of hydraulic fluid that may be fed into the cylinder 67 by means of a fitting 231 positioned in the wall of the cylinder 67. A bleed fitting 232 is also positioned in the wall of cylinder 67 to bleed off brake fluid after braking operations are completed. A rectangular shaped O-ring seal 233 is carried by the cylinder 67 and is in engagement with the piston 63 to provide a seal between the cylinder and piston. It also acts to exert a restoring force on the piston after braking operations have been completed, as is conventional in braking systems of this type.

Figure 4:
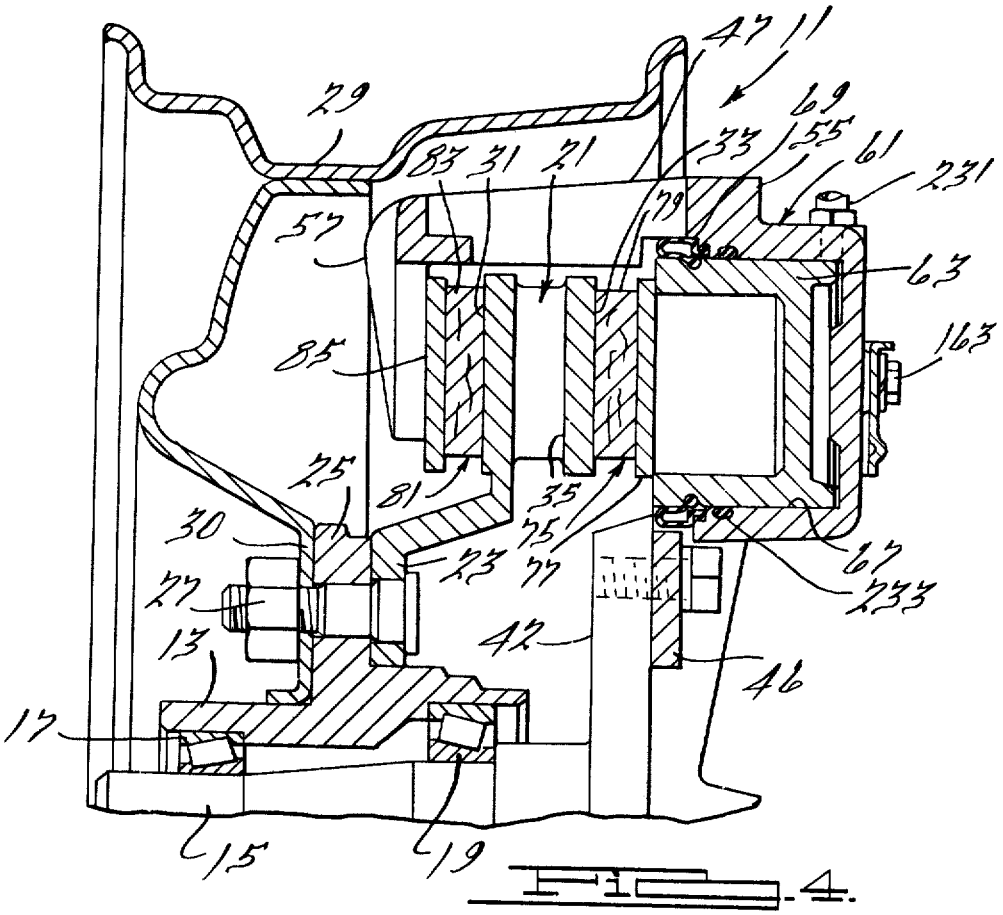
FIG. 4 is a sectional view taken along the lines 4—4 of FIG. 1.

It can be appreciated that during braking operations, hydraulic fluid under pressure is fed into the cylinder 67 through the fitting 231 thereby forcing the piston 63 to the left as viewed in FIG. 4 and causing movement of the brake shoe 75 to the left through the engagement of the piston 63 with the backing plate 77. This forces the brake lining 79 into braking engagement with braking face 33 of the rotor 21. The introduction of hydraulic fluid into the cylinder 67 also moves the caliper 47 to the right as shown in FIG. 4 so that the reaction portion 57 moves the brake shoe 81 to the right as viewed in FIG. 4 thereby bringing the brake lining 82 into engagement with the braking face 31 of the rotor 21 with a braking force.

The movement of the caliper 47 relative to the fixed torque plate 41 to the right, as shown in FIG. 4 is permitted by the flexing of the U-shaped portions or hinges 171 and 173 of the flexible strap 155 and by the deformation of the grommets 107 and 109 which position the pins 87 and 89 in the flanges of the caliper 47.

As previously pointed out, the braking torque absorbed by the brake shoe 75 is transferred to the main body portion 46 of the torque plate 41 through the studs 141 and 143 and when the brake lining 79 becomes worn through the opposed surfaces 213 and 215 positioned on the arms 191 and 193 of the torque plate. The braking torque of the second brake shoe 81 is transferred to the reaction portion 57 of the caliper 47 through the opposed surfaces 181 and 183 positioned on the backing plate 85 of the brake shoe 81 which come into engagement with the complementary surfaces 185 and 187 on the reaction portion 57 of the caliper 47.

The transfer of the braking torque from the first brake shoe 75 to the torque plate 41 and the transfer of the braking torque from the second brake shoe 81 to the reaction portion 57 of the caliper 47 creates a twisting couple that tends to twist the caliper with respect to the torque plate. It can be seen by reference to FIG. 1 that the moment arm of this twisting couple is of considerable length and since the caliper is attached to the torque plate 41 by means of the flexible strap 155, considerable twisting of the caliper 47 with respect to the torque plate would tend to occur. This twisting couple, however, is prevented by the engagement of the spaced abutment surfaces 204 and 206 on the axially extending arms 191 and 193 of the torque plate 41 with the complementary surfaces 209 and 211 on the caliper 47.

When the braking operations are completed, the piston 63 and the caliper 47 will be returned to their nonbraking position by the O-ring 233 which has become distorted during braking operations. This action is aided by the restoring force exerted by the grommets 107 and 109 that engage the pins 87 and 89. Hydraulic fluid in the cylinder 67 is bled off at this time through the bleed fitting 232.

The present invention thus provides an extremely effective, inexpensive and compact means for preventing twisting of a caliper about a torque plate in a disk brake arrangement to thereby prevent uneven wear of the edges of the brake shoes that might otherwise occur.

While it will be apparent that the preferred embodiment of the invention herein disclosed is well calculated to fulfill the objects above stated, it will be appreciated that the invention is susceptible to modification, variation and change without departing from the proper [scope or] *and* fair meaning of the following claims.

What is claimed is:

1. A disk brake for braking a rotatable disk comprising a fixed torque plate, a caliper having a fluid motor portion adapted to be positioned on one side of the disk, a reaction portion adapted to be positioned on the other side of the disk and a pair of circumferentially spaced, axially extending shoulders intermediate said fluid motor and reaction portions, a first brake shoe disposed adjacent the fixed torque plate and adapted to engage one side of the disk, said first brake shoe being motivated by said fluid motor portion, a second brake shoe disposed adjacent said reaction portion and adapted to engage the other side of the disk and motivated by said reaction portion, said second brake shoe being arranged to transmit its braking torque to said caliper, said fixed torque plate comprising a main body portion positioned between said fluid motor portion of said caliper and said first brake shoe and generally parallel to the plane of rotation of the disk, and a pair of integrally formed circumferentially spaced arms, each of said arms having an axially extending abutment surface positioned radially outwardly of the outer periphery of the disk and between the planes of the opposite sides of the disk for sliding engagement by one of said caliper shoulders whereby said caliper is restrained against rotation by said torque plate.

2. The combination of claim 1 in which a first pin is rigidly affixed to one of said spaced radially outwardly extending arms on said torque plate, a second pin is rigidly affixed to the other of said radially outwardly extending arms, said pins extending in a plane generally perpendicular to the plane of the rotatable disk, and means on said brake shoes engaging said pins for supporting said brake shoes for movement in a direction generally perpendicular to the plane of rotation of the disk.

3. The combination of claim 2 in which said pins extend in opposed directions from said torque plate and spaced means on either side of said torque plate receive said pins for relative movement with respect thereto.

4. The combination of claim 1 in which a first pair of spaced inwardly extending shoulders extending in a direction generally perpendicular to the plane of rotation of the disk is positioned on said torque plate, said first brake shoe being engageable with said first pair of spaced inwardly extending shoulders during braking operations and in which a second pair of spaced shoulders extending generally perpendicular to the plane of rotation of the disk is positioned on said torque plate and is spaced axially inwardly of said first pair of spaced shoulders, said second pair of spaced shoulders being engageable with said first brake shoe when the brake lining thereon becomes worn.

5. The combination of claim 1 including a flexible strap having a first portion fixed to said fixed torque plate and a second portion fixed to the fluid motor portion of said caliper.

6. The combination of claim 5 in which said flexible strap has spaced hinges interconnecting said first portion and said second portion and having parallel axes positioned in a generally vertical direction.

7. The combination of claim 1 including a pair of inwardly facing spaced abutment surfaces on the main body portion of the torque plate engaging complementary outwardly facing spaced shoulders positioned on said caliper adjacent said first brake shoe.

8. The combination of claim 1 in which said main body portion of said torque plate extends in a plane generally parallel to the plane of rotation of the disk and is positioned intermediate the disk and the fluid motor portion of said caliper.

9. The combination of claim 8 in which said main body portion of said torque plate has a pair of inwardly facing spaced shoulders engageable with complementary outwardly facing shoulders on the fluid motor portion of the caliper.

10. The combination of claim 1 in which said main body portion of said torque plate extends in a plane generally parallel to the plane of rotation of the disk and in which a pair of spaced studs having spaced inwardly facing shoulders extending in a direction toward the disk is affixed to said main body portion of said torque plate and said first brake shoe has spaced outwardly facing shoulders engageable with said spaced inwardly facing shoulders on said studs.

11. The combination of claim 10 including a flexible strap coupling said torque plate to said fluid motor portion of said caliper, said flexible strap having end portions and an intermediate portion with said end portions being coupled to said intermediate portion by spaced hinges, said end portions being affixed to said torque plate by fastening means engaging complementary fastening means on said spaced studs, said fastening means on said spaced studs extending from said torque plate in a direction opposite to that of said spaced shoulders on said studs.

*12. The combination of claim 1 further including cooperating abutment means on said first brake shoe and upon said torque plate for the transmitting at least of the braking torque from said first brake shoe to said torque plate.*

*13. The combination of claim 1 further including pin means affixed relative to said torque plate and extending in a direction substantially perpendicular to the plane of rotation of the disk, and means on said caliper cooperating with said pin means for assisting in the sliding support of said caliper.*

*14. The combination of claim 13 wherein the pin means has a first portion extending outwardly from one side of said torque plate, a second portion extending outwardly from the other side of said torque plate and an intermediate portion affixed to said torque plate, the means on said caliper cooperating with said pin means comprising means on said fluid motor portion defining first aperture means through which said first pin means portion passes, and means on said reaction portion defining second aperture means through which said second pin means portion extends.*

*15. The combination of claim 14 wherein said intermediate portion of said pin means is threaded into said torque plate for fixing said pin means to said torque plate.*

*16. The combination of claim 14 wherein resilient grommet means are interposed between at least one of said pin means portions and the respective aperture means of said caliper for exerting a restoring force upon said caliper.*

*17. The combination of claim 15 wherein said pin means comprises first and second pins each of which is affixed to a respective one of said torque plate arms.*

References Cited

The following references, cited by the Examiner, are of record in the patented file of this patent or the original patent.

UNITED STATES PATENTS

| | | | |
|---|---|---|---|
| 3,194,351 | 7/1965 | Swift | 188—73 |
| 3,260,332 | 7/1966 | Wells | 188—73 |
| 3,269,490 | 8/1966 | Swift | 188—73 |
| 3,299,991 | 1/1967 | DeCastelet | 188—73 |
| 3,312,309 | 4/1967 | Sturis | 188—73 |
| 3,315,769 | 4/1967 | Francois | 188—73 |
| 3,330,385 | 7/1967 | Swift | 188—73 |

FOREIGN PATENTS 1,345,151 10/1963 France.

GEORGE E. A. HALVOSA, Primary Examiner